United States Patent
Schneider

(10) Patent No.: US 7,096,741 B2
(45) Date of Patent: Aug. 29, 2006

(54) METHOD AND SYSTEM FOR REDUCING OPERATIONAL SHOCK SENSITIVITY OF MEMS DEVICES

(75) Inventor: David Schneider, Melbourne, FL (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 11/000,628

(22) Filed: Dec. 1, 2004

(65) Prior Publication Data

US 2006/0010985 A1    Jan. 19, 2006

Related U.S. Application Data

(60) Provisional application No. 60/587,992, filed on Jul. 14, 2004.

(51) Int. Cl.
  *G01L 1/00* (2006.01)
(52) U.S. Cl. ...................... 73/765; 73/12.04
(58) Field of Classification Search ............ 73/765
  See application file for complete search history.

(56) References Cited

U.S. PATENT DOCUMENTS 4,916,635 A * 4/1990 Singer et al. ............... 700/254
6,532,096 B1   3/2003 Berhane et al. ............. 359/230
6,708,082 B1   3/2004 Oettinger et al. ........... 700/275
2002/0101129 A1  8/2002 Grade et al. ................. 310/309
2002/0113191 A1  8/2002 Rolt et al. ................... 248/550
2003/0091270 A1* 5/2003 Abbott et al. ................. 385/18
2003/0174376 A1  9/2003 Sane et al. ................... 359/237
2005/0008045 A1* 1/2005 Xie et al. ...................... 372/20

* cited by examiner

*Primary Examiner*—David M. Gray
*Assistant Examiner*—Lori Moorman
(74) *Attorney, Agent, or Firm*—Allen, Dyer, Doppelt, Milbrath & Gilchrist, P.A.

(57) ABSTRACT

A method and system for reducing operational shock sensitivity of a MEMS device includes a closed-loop control circuit for controlling the MEMS device and a shock detector for detecting a shock experienced by the MEMS device. The closed-loop control circuit includes a movable MEMS structure, a detector for sensing a position of the MEMS structure and for providing a first feedback signal related to the sensed position, and a processor for receiving the first feedback signal and for providing a control signal used to control the MEMS device. The shock detector, which according to a preferred embodiment is the MEMS structure itself, is used for detecting the shock experienced by the MEMS device and for generating a second feedback signal, which is used to alter the control signal such that a response of the closed-loop control circuit to the shock is minimized.

28 Claims, 2 Drawing Sheets

METHOD AND SYSTEM FOR REDUCING OPERATIONAL SHOCK SENSITIVITY OF MEMS DEVICES

CROSS-REFERENCE TO RELATED APPLICATIONS

This application claims the benefit of U.S. Provisional Application No. 60/587,992 filed Jul. 14, 2004, the contents of which are incorporated by reference herein.

MICROFICHE APPENDIX

Not Applicable.

TECHNICAL FIELD

The present application relates generally to microelectromechanical systems (MEMS) and, more particularly, to a method and system for reducing operational shock sensitivity of MEMS devices.

BACKGROUND OF THE INVENTION

Microelectromechanical systems (MEMS) integrate electrical and mechanical components on a single substrate, such as silicon, using microfabrication technologies. Typically, the electrical components are fabricated using integrated circuit processes, while the mechanical components are fabricated using micromachining processes that are compatible with the integrated circuit processes.

MEMS devices are found in an increasing number of applications, from sensor technology, to biomedicine, to telecommunications. Presently, some of the most interesting applications for MEMS devices are optical applications, wherein the tiny mechanical components include mirrors, prisms and/or gratings. For example, in the area of telecommunications, optical MEMS devices form optical switches, modulators, attenuators, and filters.

In most MEMS devices, one or more actuators are provided to position the tiny mechanical components. Some examples of MEMS actuators include electrostatic, thermal, electromagnetic, and/or piezoelectric actuators. In order to limit the actuation power, current, or voltage, and thus minimize the size and cost of the MEMS device, MEMS structures are generally designed to require a relatively low actuation energy. For example, when the mechanical components are coupled to the substrate via a cantilever or one or more springs, it is generally preferred that the spring constant(s) be relatively weak. However, MEMS structures with weak spring constants are susceptible to undesired perturbations. For example, mechanical shock or vibration often results in an impulse that occurs at the natural mechanical vibrational frequency of the MEMS structure.

If the MEMS structure is an integral part of a closed loop control system, which is subject to this impulse error, the control system will apply feedback in an attempt to neutralize the error. Unfortunately, most control systems operate at bandwidths much lower in frequency than the natural mechanical frequency of the MEMS structure in order to avoid difficulties associated with lag due to mechanical inertia. Accordingly, as the mechanical impulse damps out, the control system applies a delayed response to compensate. This compensation is not required, and thus introduces a large additional error due to inappropriate delayed feedback. This additional and delayed error significantly contributes to the operational shock sensitivity of MEMS devices.

It is an object of the instant invention to reduce the operational shock sensitivity of MEMS devices.

SUMMARY OF THE INVENTION

The instant invention relates to a method and system that reduces the operational shock sensitivity of MEMS devices by detecting the occurrence of a shock or vibration and reducing and/or limiting the response of a control system thereto.

According to a preferred embodiment, the shock or vibration is detected using the MEMS structure itself. More specifically, the MEMS structure is used essentially as an accelerometer to measure the mechanical acceleration resulting from the shock or vibration. Upon detection of the transient shock or vibration, closed loop parameters are altered to reduce or obviate the response of the control system to the shock.

In accordance with one aspect of the instant invention there is provided a method for reducing operational shock sensitivity of a MEMS device comprising: detecting a shock experienced by the MEMS device; and, altering closed-loop parameters of the MEMS device in dependence upon the detected shock such that effects of the shock are other than compensated for.

In accordance with another aspect of the instant invention there is provided a method for reducing operational shock sensitivity of a MEMS device comprising: providing a MEMS device having a MEMS structure coupled to a controller in a closed-loop configuration, the controller for providing a control signal used to drive the MEMS structure; detecting a shock experienced by the MEMS device, a magnitude of the shock being sufficient to cause the MEMS structure to resonate at its natural mechanical vibration frequency $f_o$ for a damping time $t_d$; and, upon detecting the shock, altering the control signal such that an amount the MEMS structure is driven in response to the shock is reduced.

In accordance with another aspect of the instant invention there is provided a method for reducing operational shock sensitivity of a MEMS device comprising: controlling the MEMS device using a closed-loop control circuit, the closed-loop control circuit including a movable MEMS structure, a detector for sensing a position of the MEMS structure and for providing a feedback signal related to the sensed position, and a processor for receiving the feedback signal and for providing a control signal used to control the MEMS device, the control signal determined in dependence upon the feedback signal; detecting a shock experienced by the MEMS device; and, altering the control signal in dependence upon the detected shock such that a response of the closed-loop control circuit to the shock is minimized.

In accordance with yet another aspect of the instant invention there is provided a system for reducing operational shock sensitivity of a MEMS device comprising: a closed-loop control circuit for controlling the MEMS device, the closed-loop control circuit including a movable MEMS structure, a detector for sensing a position of the MEMS structure and for providing a first feedback signal related to the sensed position, and a processor for receiving the first feedback signal and for providing a control signal used to control the MEMS device, the control signal determined in dependence upon the first feedback signal; and, a shock detector for detecting a shock experienced by the MEMS device and for generating a second feedback signal, the second feedback signal used to alter the control signal such that a response of the closed-loop control circuit to the shock is minimized.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

Figure 1:
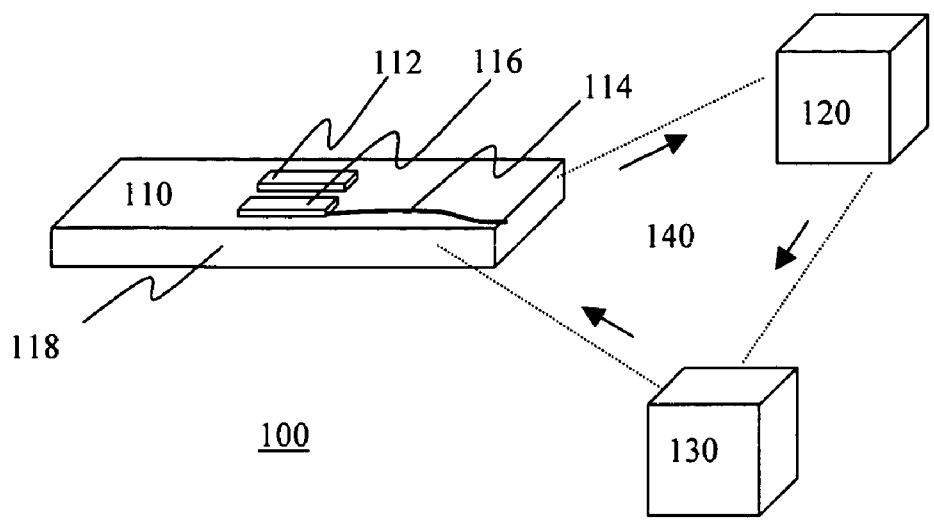
FIG. 1 is a schematic diagram of a prior art control system used in a MEMS device.

Referring to FIG. 1, there is shown a schematic diagram of a control system used in a prior art MEMS device. The control system 100 includes a MEMS structure 110, a detector 120, and a controller 130. The controller 130 is electrically connected to the MEMS structure 110 and the detector 120, such that it forms a part of the closed loop feedback circuit 140. The MEMS structure 110 has a mechanical component 112, an electrical component 114, and an actuator 116, all formed on a same substrate 118.

In operation, the controller 130 provides a control signal that drives the actuator 116, thus moving the mechanical component 112. As the mechanical component 112 moves, the detector 120 measures a parameter related to the position of the mechanical component 112, and provides a feedback signal to the controller 130. The controller 130 alters the control signal sent to the actuator 116 in dependence upon the feedback signal. Typically, the altered control signal is generated from an error signal produced by comparing the parameter measured by the detector 120 to a known parameter. Error signals are well known in the art and are not discussed further.

When the MEMS device experiences a shock, such as a mechanical shock, the mechanical component 112 is subject to a transient mechanical vibration at its natural mechanical frequency $f_o$ for a characteristic time commonly referred to as its damping time $t_d$. Until the mechanical vibration damps out, the changing position (i.e., arising from the shock and/or actuation) of the mechanical component 112 is sensed by the detector 120, and the closed loop feedback system 140 attempts to compensate for this effect of the shock. However, due to the relatively slow response time $t_r$ of the closed loop feedback system (i.e., $t_r > t_d$), the perturbations experienced by the mechanical component 112 often disappear before the feedback and compensating control signals are processed. The net result is that the closed loop feedback system actually prolongs the effect of shock on the operation of the MEMS device.

Figure 2:
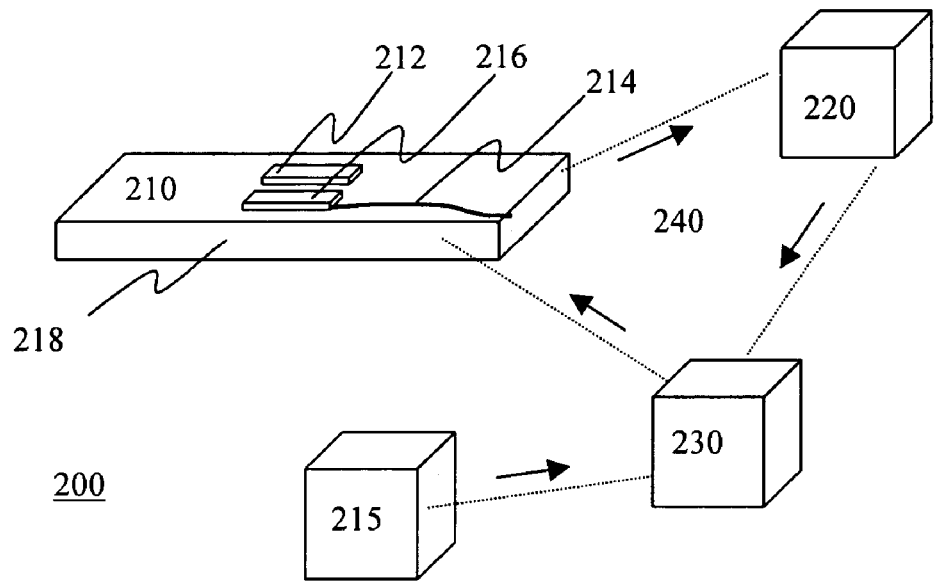
FIG. 2 is a schematic diagram of a control system used in a MEMS device in accordance with one embodiment of the instant invention.

Referring now to FIG. 2, there is shown a schematic diagram of a control system used in a MEMS device in accordance with an embodiment of the instant invention. The control system 200 includes a MEMS structure 210, a shock or vibration detector 215, a detector 220, and a controller 230. The controller 230 is electrically connected to the MEMS structure 210 and the detectors 215, 220, such that it forms a part of the closed loop feedback circuit 240. The MEMS structure 210 has a mechanical component 212, an electrical component 214, and an actuator 216, all formed on a same substrate 218.

In operation, the controller 230 provides a control signal that drives the actuator 216, thus moving the mechanical component 212. As the mechanical component 212 moves, the detector 220 measures a parameter related to the position of the mechanical component 212, and provides a feedback signal to the controller 230. The controller 230 alters the control signal sent to the actuator 216 in dependence upon the feedback signal. Typically, the altered control signal is generated from an error signal produced by comparing the parameter measured by the detector 220 to a known parameter. Error signals are well known in the art and are not discussed further.

When the MEMS device experiences a shock, such as a mechanical shock, the mechanical component 212 is subject to a transient mechanical vibration at its natural mechanical frequency $f_o$ for a characteristic time commonly referred to as its damping time $t_d$. Until the mechanical vibration damps out, the detector 220 senses the changing position of the mechanical component 212 (i.e., arising from the shock and/or the actuation) and provides an erroneous feedback signal to the controller 230. Simultaneously, the detector 215 senses the shock and provides a shock feedback signal to the controller 230. Upon receiving the shock feedback signal, the controller 230 alters the control signal sent to the MEMS actuator 216 such that it does not attempt to compensate for the effects of the shock. For example, according to one embodiment the controller 230 sends a control signal that temporarily reduces or limits the gain of the closed loop circuit 240. The net result is that the feedback system does not significantly prolong the effect of shock on the operation of the MEMS device.

Advantageously, this embodiment of the instant invention does not attempt to prevent the mechanical perturbation and/or alter the damping time, but instead allows the natural mechanical damping to occur while the response of the closed loop feedback system is altered. Accordingly, the fabrication of the MEMS device with reduced operational shock sensitivity remains relatively simple.

Figure 3:
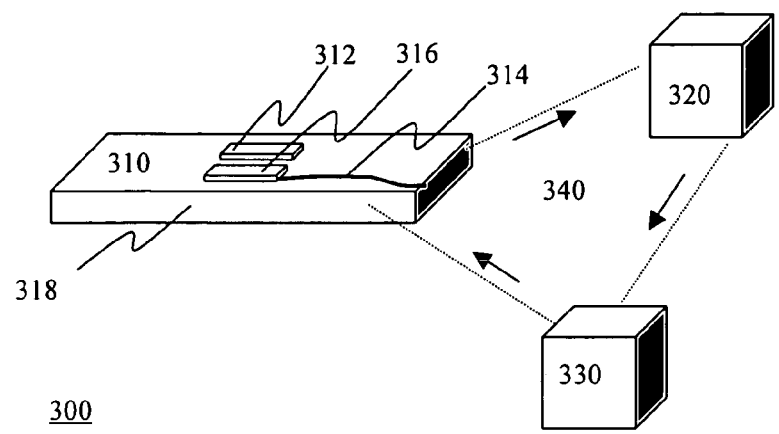
FIG. 3 is a schematic diagram of a control system used in a MEMS device in accordance with another embodiment of the instant invention.

Referring now to FIG. 3, there is shown a schematic diagram of a control system used in a MEMS device in accordance with another embodiment of the instant invention. The control system 300 includes a MEMS structure 310, a detector 320, and a controller 330. The controller 330 is electrically connected to the MEMS structure 310 and the detector 320, such that it forms a part of the closed loop feedback circuit 340. The MEMS structure 310 has a mechanical component 312, an electrical component 314, and an actuator 316, all formed on a same substrate 318.

In operation, the controller 330 provides a control signal that drives the actuator 316, thus moving the mechanical component 312. As the mechanical component 312 moves, the detector 320 measures a parameter related to the position of the mechanical component 312, and provides a feedback signal to the controller 320. The controller 330 alters the control signal sent to the actuator 316 in dependence upon the feedback signal. Typically, the altered control signal is generated from an error signal produced by comparing the parameter measured by the detector 320 to a known parameter.

When the MEMS device experiences a shock, such as a mechanical shock, the mechanical component 312 is subject to a transient mechanical vibration at its natural mechanical frequency $f_o$ for a characteristic time commonly referred to as its damping time $t_d$. Until the mechanical vibration damps out, the detector 320 senses the changing position of the mechanical component 312 (arising from the shock and/or the actuation) and provides an erroneous feedback signal to the controller 330 (i.e., which is used to calculate an erroneous error signal). The controller 330 uses the derivative of the error signal with time as a filter to monitor for mechanical impulses. More specifically, the controller 330 provides a threshold for the maximal rate of change (limited by the resonant frequency of the MEMS structure) that the control system operates in. When the rate of change of the error term exceeds this threshold, a shock transient has been qualified. Alternatively, the change in the parameter measured by the detector with time is measured directly to monitor for mechanical impulses. Upon detection of the shock impulse, the controller 330 alters the control signal sent to the MEMS actuator 316 such that it does not attempt to compensate for the effects of the shock, or at least such that the compensation is minimal. For example, the magnitude of the shock transient is optionally used to reduce the systems gain proportionately (i.e., to zero or another small value) for the duration of the settling time of the MEMS device. Alternatively, the controller 330 (or another controller not shown) reduces the gain of coupled circuits and/or systems to suppress propagation of shock induced transient. The net result is that the feedback system does not significantly prolong the effect of shock on the operation of the MEMS device.

Advantageously, this embodiment of the instant invention does not attempt to prevent the mechanical perturbation and/or alter the damping time, but instead allows the natural mechanical settling to occur while the response of the closed loop feedback system is altered. Accordingly, the fabrication of the MEMS device with reduced operational shock sensitivity remains relatively simple. Moreover, since the shock is detected by monitoring the closed loop control feedback using the derivative of the error signal with time (i.e., the MEMS structure itself functions essentially as an accelerometer), there is no need for additional components (e.g., a separate shock detector).

Notably, the instant invention is particularly useful for MEMS devices used in optical communication systems, where the effect of shock is frequently expressed as a perturbation in optical power signal levels, and thus, is often relayed to separate feedback control systems downstream from the MEMS device. For example, if the mechanical component is an optical mirror in a fiber optic communications transmitter, a mechanical impulse will modulate the output power coupled to a separate system. The series fiber optic components in the signal path of the separate system will attempt to regulate the change in launch power, inducing complex interactions which often take several frames to damp out. If the impulse is suppressed quickly at the source, the system will recover significantly faster. The faster recovery results in an error burst, but also reduces the chances of switching to a redundant path, which is a more severe consequence.

Figure 4:
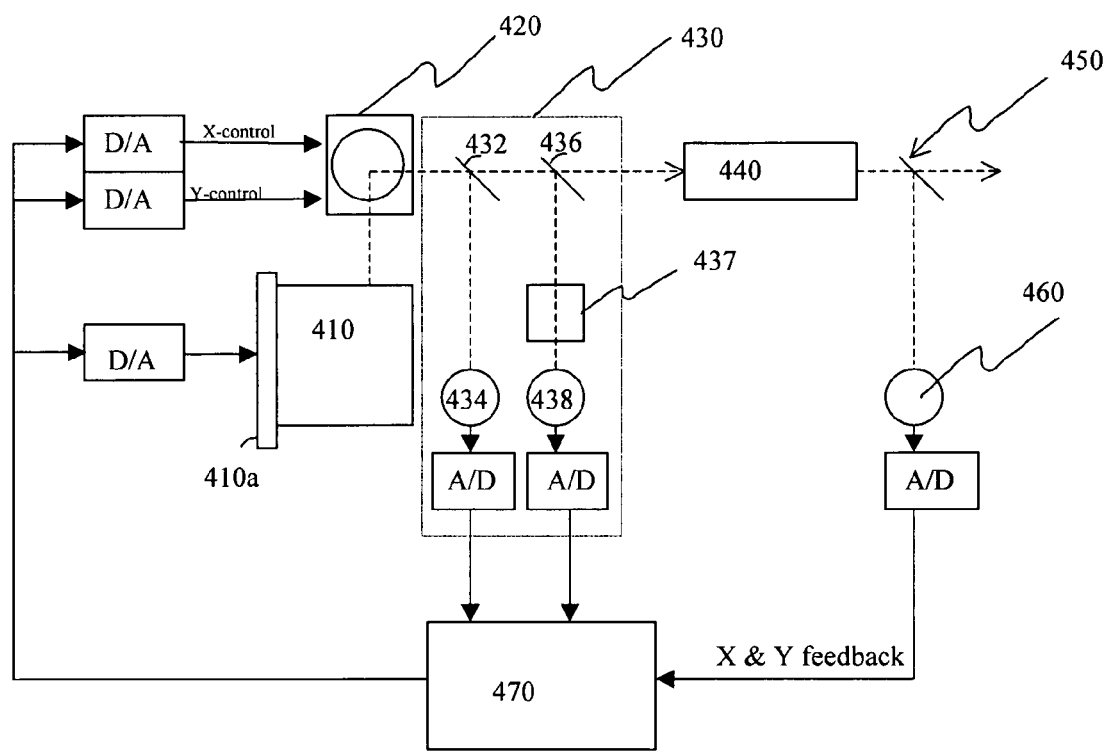
FIG. 4 is a schematic diagram of a control system used in an optical MEMS device in accordance with one embodiment of the instant invention.

Referring to FIG. 4, there is shown an embodiment of the instant invention described with respect to a control system used in a fiber optic transmitter. The control system 400 includes a laser 410, a MEMS mirror 420, a wavelength detector 430, an optical modulator 440, a beamsplitter 450, a photodetector 460, and a microprocessor 470.

The MEMS mirror 420 is an electrostatically actuated 2-axis structure providing active alignment in the X and Y directions (with Y being in the plane of FIG. 4, while X is perpendicular to the plane). Together with the photodetector 460 and microprocessor 470, the MEMS mirror 420 forms part of a first closed loop feedback circuit used to control the average optical power transmitted by the modulator 440. More specifically, the MEMS mirror 420 is dithered axially to change the coupling efficiency of the beam of light to the modulator 440 in a time interleaved fashion (X for 50 cycles, Y for 50 cycles, X for 50 cycles, etc.). In order to have the ability to distinguish the independent X and Y power variations at the photodetector 460, the photocurrent produced by the photodetector 460 is synchronously demodulated with the time interleaved X and Y dithers. The independent X and Y demodulated signals contain the error information with respect to optimal X,Y beam alignment. The microprocessor 470 uses these error signals to control the independent X and Y MEMS angles.

The laser 410 is a temperature tunable laser, such as a distributed feedback laser (DFB) and is coupled to the thermoelectrical cooler (TEC) 410a, which controls the temperature and thus wavelength of the laser 410. The wavelength detector 430 is a wavelength locking system that uses a first beamsplitter 432 for tapping a portion of the optical signal to be measured at a first photodetector 434 and a second beamsplitter 436 for tapping another portion of the optical signal that is measured at a second photodetector 438. An etalon 437 is provided between the second beamsplitter 436 and the second photodetector 438. The etalon 437 is an optical filter device with periodic transmission peaks used to determine the wavelength or frequency error of the laser 410. Together with the laser 410 and the microprocessor 470, the wavelength detector 430 forms part of a second closed loop feedback circuit, which is used to control the wavelength of light that is transmitted by the modulator 440. More specifically, the ratio of the photocurrents from the reference photodetector 434 and the wavelocking photodetector 438 yields information pertaining to the wavelength error of the laser 410. These photocurrents are processed by the microprocessor 470, with feedback applied to TEC 410a to regulate wavelength. The time constant of significant wavelength change is on the order of a second due to the relatively large thermal mass of the TEC element. Accordingly, instantaneous laser frequency changes on the order of one gigahertz per millisecond (1 GHz/ms) are virtually impossible due to this thermal mass.

Each photodetector 434, 438, and 460 is an optical detector, such as a photodiode. Analog-to-digital (A/D) converters are used to convert the photocurrents provided by these photodetectors into appropriate feedback signals that are transmitted to the microprocessor 470, while digital-to-analog (D/A) converters convert the control signals provided from the microprocessor 470 into appropriate drive currents that are transmitted to the MEMS driver circuitry (not shown).

In operation, the laser 410 provides a beam of light that is incident on the mirror 420 and reflected towards the wavelength detector 430. A small portion (e.g., less than 10%) of the beam of light is tapped by the wavelength detector 430, while the remaining portion is transmitted to the modulator 440. The modulator 440 modulates the light and transmits it to a separate system. A small portion of the modulated light is tapped by the beamsplitter 450 and the optical intensity is measured by the photodetector 460. The feedback signals provided by the wavelength detector 430 and photodetector 460 are received by the microprocessor 470 and are used to calculate error signals related to the wavelength error and optical intensity errors, respectively. The microprocessor sends a control signal to the TEC 410a and electrostatic actuator of the mirror 420 in dependence upon the feedback signals.

When the MEMS device experiences a shock, such as a mechanical shock, the mirror is subject to a transient mechanical vibration at its natural mechanical frequency $f_o$ for a characteristic time commonly referred to as its damping time $t_d$. Until the mechanical vibration damps out, the detectors 430 and 460 sense the changing position of the mirror and provide erroneous feedback signals to the microprocessor 470. More specifically, the erroneous feedback signals arise from the oscillating mirror motion, which affects the coupling efficiency to the modulator target 440 and also alters the incident beam angle to the etalon 437 in the wavelength detector 430. Since etalons are very sensitive to incident angle, a transmission peak offset proportional to the magnitude of the shock results. This offset is seen as a frequency error.

To discriminate real wavelength errors from shock impulses, the derivative of the wavelength error signal (the ratio of optical intensities at photodetectors 434 and 438), is calculated, and a threshold which is outside of the normal operating conditions of the closed loop circuit 480 is derived. In particular, if the change in the wavelength error signal is larger than the wavelength can physically change, than a shock is identified. Once a shock is identified, the gain of the MEMS X and Y controls from the microprocessor 470 are reduced for the duration of the MEMS natural damping time and/or for the settling time of the MEMS device. Alternatively, or in addition to, the gain of the TEC control from the microprocessor 470 is reduced for the duration of the MEMS natural damping time. The damping time is a function of the physical implementation of the MEMS structure.

Advantageously, this embodiment of the instant invention does not attempt to prevent the mechanical perturbation and/or alter the damping time, but instead allows the natural mechanical settling to occur while the response of a closed loop feedback system is altered. Accordingly, the fabrication of the MEMS device with reduced operational shock sensitivity remains relatively simple. Moreover, since the shock is detected by monitoring the closed loop control feedback using the derivative of the wavelength error signal (i.e., the MEMS structure and the wavelength detector function together as an accelerometer), there is no need for additional components (e.g., a separate shock detector).

Notably, as shown above, the instant invention is particularly useful for MEMS devices with electrostatically driven MEMS structures. Electrostatically driven MEMS structures, which are generally known to have weak spring constants, are desirable for their low cost and high efficiency. The effects of undesired perturbations on electrostatically driven MEMS devices are well known, and are for example, discussed in U.S. Pat. No. 6,532,096, U.S. Pub. No. 2002/0113191, and U.S. Pub. No. 2002/0101129, each of which is hereby incorporated by reference.

Of course the instant invention is useful for other MEMS devices used for providing front-end signal processing in larger and more complicated signal processing systems. For example, the instant invention is also suitable for MEMS devices used in RF systems, where the MEMS device is an RF switch, reactive tuning component, phase shifter or attenuator.

The embodiments of the invention described above are intended to be exemplary only. The scope of the invention is therefore intended to be limited solely by the scope of the appended claims.

What is claimed is:

1. A method for reducing operational shock sensitivity of a MEMS device comprising:
   detecting a shock experienced by the MEMS device; and,
   altering closed-loop parameters of the MEMS device in dependence upon the detected shock such that effects of the shock are other than compensated for.

2. A method for reducing operational shock sensitivity of a MEMS device comprising:
   providing a MEMS device having a MEMS structure coupled to a controller in a closed-loop configuration, the controller for providing a control signal used to drive the MEMS structure;
   detecting a shock experienced by the MEMS device, a magnitude of the shock being sufficient to cause the MEMS structure to resonate at its natural mechanical vibration frequency $f_o$ for a damping time $t_d$; and,
   upon detecting the shock, altering the control signal such that an amount the MEMS structure is driven in response to the shock is reduced.

3. A method according to claim 2, wherein altering the control signal comprises reducing the amount the MEMS structure is driven in response to the shock for a duration substantially equal to the damping time $t_d$.

4. A method according to claim 3, wherein the control signal is generated from an error signal related to a position of the MEMS structure, and wherein the shock is detected by monitoring a derivative of the error signal.

5. A method according to claim 2, wherein the control signal is generated from an error signal related to a position of the MEMS structure, and wherein the shock is detected by monitoring a derivative of the error signal.

6. A method according to claim 3, wherein the control signal is altered so as to reduce a gain of the system.

7. A method according to claim 6, wherein the magnitude of the shock is used to determine an amount the system gain is reduced.

8. A method according to claim 2, wherein a time constant for the controller to provide the control signal is larger than the damping time $t_d$.

9. A method for reducing operational shock sensitivity of a MEMS device comprising:
   controlling the MEMS device using a closed-loop control circuit, the closed-loop control circuit including a movable MEMS structure, a detector for sensing a position of the MEMS structure and for providing a feedback signal related to the sensed position, and a processor for receiving the feedback signal and for providing a control signal used to control the MEMS device, the control signal determined in dependence upon the feedback signal;
   detecting a shock experienced by the MEMS device; and,
   altering the control signal in dependence upon the detected shock such that a response of the closed-loop control circuit to the shock is minimized.

10. A method according to claim 9, wherein the shock is detected by monitoring a change in the feedback signal with time.

11. A method according to claim 9, wherein the shock is detected by monitoring a derivative of an error signal derived from the feedback signal.

12. A method according to claim 9, wherein the control signal is used to drive the movable MEMS structure.

13. A method according to claim 9, wherein the control signal is used to drive a temperature tunable laser.

14. A method according to claim 9, wherein the control signal is altered such that the response of the closed-loop control circuit to the shock is minimized for a period of rime that allows mechanical oscillation of the MEMS structure induced by the shock to damp out naturally.

15. A method according to claim 9, wherein detecting the shock experienced by the MEMS device comprises using the MEMS structure as an accelerometer.

16. A system for reducing operational shock sensitivity of a MEMS device comprising:
 a closed-loop control circuit for controlling the MEMS device, the closed-loop control circuit including a movable MEMS structure, a detector for sensing a position of the MEMS structure and for providing a first feedback signal related to the sensed position, and a processor for receiving the first feedback signal and for providing a control signal used to control the MEMS device, the control signal determined in dependence upon the first feedback signal; and,
 a shock detector for detecting a shock experienced by the MEMS device and for generating a second feedback signal, the second feedback signal used to alter the control signal such that a response of the closed-loop control circuit to the shock is minimized.

17. A system according to claim 16, wherein the shock detector has a response time that is substantially shorter than a response time of the closed-loop control circuit.

18. A system according to claim 17, wherein a bandwidth of the closed-loop control circuit is lower in frequency than a natural resonant mechanical vibration frequency of the MEMS structure.

19. A system according to claim 18, wherein the shock detector comprises the MEMS structure.

20. A system according to claim 19, wherein the second feedback signal comprises a derivative of the first feedback signal with time.

21. A system according to claim 19, wherein the MEMS structure is electrostatically actuated.

22. A system according to claim 16, wherein the MEMS structure comprises an electrostatically driven mirror for controllably coupling light from a laser to an optical modulator.

23. A system for reducing operational shock sensitivity of a MEMS device comprising:
 a closed-loop control circuit for controlling the MEMS device, the closed-loop control circuit including a movable MEMS structure, a detector for sensing a position of the MEMS structure and for providing a first feedback signal related to the sensed position, and a processor for receiving the first feedback signal and for providing a control signal used to control the MEMS device, the control signal determined in dependence upon the first feedback signal; and,
 a shock detector for detecting a shock experienced by the MEMS device and for generating a second feedback signal, the second feedback signal used to alter the control signal such that a response of the closed-loop control circuit to the shock is minimized,
 wherein the MEMS structure comprises an electrostatically driven mirror for controllably coupling light from a laser to an optical modulator, and wherein the system includes a first photodiode for monitoring an intensity of light modulated by the optical modulator.

24. A system according to claim 23, comprising a wavelength detector for monitoring a wavelength of light transmitted to the optical modulator, the wavelength detector including a second photodiode, a third photodiode, and an etalon.

25. A system according to claim 24, comprising a first beamsplitter for directing a portion of the modulated light to the first photodiode, a second beamsplitter for directing a portion of the light transmitted towards the optical modulator to the second photodiode, and a third beamsplitter for directing a portion of the light transmitted towards the optical modulator to the etalon and third photodiode.

26. A system according to claim 25, wherein the detector for sensing a position of the MEMS structure comprises at least one of the first photodiode and the wavelength detector.

27. A system according to claim 26, wherein the shock detector comprises the mirror and the processor, and wherein second feedback signal is derived from a derivative of the first feedback signal with time.

28. A method according to claim 2, wherein upon detecting the shock experienced by the MEMS device, a natural mechanical damping of the MEMS structure is allowed to occur.

* * * * *